United States Patent
Wang

(10) Patent No.: US 8,566,440 B2
(45) Date of Patent: Oct. 22, 2013

(54) CONTINUITY CHECK METHOD, MAINTENANCE END POINT AND SYSTEM THEREOF

(75) Inventor: Jin Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 444 days.

(21) Appl. No.: 12/567,382

(22) Filed: Sep. 25, 2009

(65) Prior Publication Data

US 2010/0082807 A1    Apr. 1, 2010

(30) Foreign Application Priority Data

Sep. 28, 2008  (CN) .......................... 2008 1 0198932

(51) Int. Cl.
*G06F 15/173* (2006.01)
*G06F 15/16* (2006.01)

(52) U.S. Cl.
USPC ............................ 709/224; 709/217; 709/229

(58) Field of Classification Search
USPC ........................................................ 709/224
See application file for complete search history.

(56) References Cited

U.S. PATENT DOCUMENTS

| | | | |
|---|---|---|---|
| 6,282,678 B1 * | 8/2001 | Snay et al. ..................... | 714/712 |
| 7,515,542 B2 * | 4/2009 | Hertoghs et al. ........... | 370/236.2 |
| 8,018,863 B2 * | 9/2011 | Kini et al. .................... | 370/248 |
| 2001/0002193 A1 * | 5/2001 | Fourie et al. ................. | 370/360 |
| 2007/0014290 A1 * | 1/2007 | Dec et al. ...................... | 370/390 |
| 2007/0025256 A1 * | 2/2007 | Hertoghs et al. ........... | 370/236.2 |
| 2007/0223493 A1 | 9/2007 | Sridhar et al. | |
| 2008/0056254 A1 * | 3/2008 | Sridhar et al. ................ | 370/390 |
| 2008/0181188 A1 * | 7/2008 | Aghvami et al. ............. | 370/338 |
| 2008/0259807 A1 * | 10/2008 | Yan ............................... | 370/242 |
| 2009/0073988 A1 * | 3/2009 | Ghodrat et al. ........... | 370/395.53 |
| 2009/0154478 A1 * | 6/2009 | Sridhar et al. ................ | 370/401 |
| 2009/0161566 A1 * | 6/2009 | Sridhar et al. ................ | 370/252 |
| 2009/0268609 A1 * | 10/2009 | Koch et al. ..................... | 370/222 |
| 2010/0290345 A1 * | 11/2010 | Gero et al. ................ | 370/241.1 |

FOREIGN PATENT DOCUMENTS

| | | |
|---|---|---|
| CN | 1756184 A | 4/2006 |
| CN | 1937531 A | 3/2007 |
| CN | 101179451 A | 5/2008 |
| CN | 101197733 A | 6/2008 |

(Continued)

OTHER PUBLICATIONS

First Office Action in Chinese Application No. 200810198932.6, mailed May 7, 2010.

(Continued)

*Primary Examiner* — Richard G Keehn
(74) *Attorney, Agent, or Firm* — Leydig, Voit & Mayer, Ltd.

(57) ABSTRACT

A continuity check method includes the following steps. A maintenance domain (MD) group is maintained in a network, in which the MD group includes a plurality of maintenance end points (MEPs) in the network, and an MD group information base is configured, and the MD group information base stores information about the plurality of MEPs. According to the information stored in the MD group information base, a continuity check message is initiated, and then, the continuity in the network is determined according to information returned from the plurality of MEPs in the MD. An MEP network system is further provided. Through the method and the system, no mis-check of the continuity will occur when the MEPs in the MD group initiate the continuity check.

6 Claims, 7 Drawing Sheets

(56) References Cited

FOREIGN PATENT DOCUMENTS

| | | |
|---|---|---|
| CN | 101369922 B | 4/2011 |
| EP | 1 791 294 A1 | 11/2006 |
| EP | 1 895 718 A1 | 8/2007 |

OTHER PUBLICATIONS

Communication in European Application No. 09171409.7-2416, mailed Dec. 2, 2009.

Communication in European Application No. 09 171 409.7-2416, mailed Jul. 14, 2010.

"Draft Standard for Local and Metropolitan Area Networks—Virtual Bridged Local Area Networks—Amendment 5: Connectivity Fault Management," *The Institute of Electrical and Electronics Engineers, Inc.*, Standard No. IEEE P802.1ag/D8.1, Jun. 18, 2007.

"IEEE Standard for Local and metropolitan area networks—Virtual Bridged Local Area Networks—Amendment 5: Connectivity Fault Management," *IEEE*, Standard No. IEEE 802.1ag-2007 (Amendment to IEEE Standard No. IEEE 802.IQ-2005), Dec. 17, 2007.

"Series Y: Global Information Infrastructure, Internet Protocol Aspects and Next-Generation Networks—Internet protocol aspects—Operation, administration and maintenance: OAM functions and mechanisms for Ethernet based networks," *International Telecommunications Union*, ITU-T Recommendation Y.1731 (Feb. 2008).

"Series Y: Global Information Infrastructure, Internet Protocol Aspects and Next-Generation Networks—Internet protocol aspects—Operation, administration and maintenance: OAM functions and mechanisms for Ethernet based networks," *International Telecommunications Union*, ITU-T Standard Y.1731 (May 2006).

$2^{nd}$ Office Action in corresponding European Application No. 09171409.7 (Jan. 31, 2011).

\* cited by examiner

CONTINUITY CHECK METHOD, MAINTENANCE END POINT AND SYSTEM THEREOF

CROSS-REFERENCE TO RELATED APPLICATION

This application claims priority to Chinese Patent Application No. 200810198932.6, filed on Sep. 28, 2008, which is hereby incorporated by reference in its entirety.

FIELD OF THE INVENTION

The present invention relates to a communication technology field, and more particularly to a continuity check method for a maintenance end point (MEP) of an Ethernet (ETH) operation administration and maintenance (OAM), and an MEP, as well as a system thereof.

BACKGROUND OF THE INVENTION

In Metro Ethernet Forum, the Carrier Ethernet (CE) is longitudinally divided into three layers, and each layer has an independent OAM capability. The OAM function of an ETH service layer is independent from an upper layer application, for example, an internet protocol (IP) layer or a transmission technique of a lower layer, for example, a synchronous digital hierarchy (SDH), thereby providing ETH services by adopting different techniques. The OAM function of each layer is enhanced by one another, thereby providing desirable failure and performance management.

In IEEE 802.1ag, a maintenance domain (MD), a maintenance association (MA), an MD level, an MEP, and a maintenance intermediate point (MIP), as well as other concepts are defined. The MEP is associated with the MA, is a node on a border of the MA, and is an initiator of all OAM frames. The MEP is indicated by two parameters, that is, 1. an MAID and 2. an MEPID. The MAID is configured to indicate which MA the MEP belongs to. The MEPID is configured to indicate one MEP in one MA identified by the MAID, and one MEP has an overall uniqueness in the MA. In one word, as for a represented range, a relation of MEP MA MD exists. The MEP is divided into two types, that is, an Out-line type and an On-line type.

In Y.1731, the concept of MD is not defined, but a maintenance entity group (MEG) defined in Y.1731 is the same as the MA, an MEG Level is the same as the MD Level, and the MEP and the MIP are defined in both Y.1731 and IEEE 802.1ag.

Before working, a network level OAM needs to be configured, that is, information about the MA/MEG, MD (if needed), MD Level/MEG Level, MEP, and MIP needs to be configured for a certain concerned connection. The information about all the MEPs in the same MA/MEG needs to be configured to all the MEPs in the same MA/MEG, and then, all the MEPs configured on the MA/MEG need to periodically send a continuity check message (CCM) frame. That is to say, if one MA/MEG has n MEPs, it needs to periodically receive (n−1) CCMs, and each MEP needs to send a multicast CCM to each of the other MEPs in the same MA/MEG. If any one of the MEPs in one MA finds that it does not receive the CCM sent from any one of the other (n−1) MEPs in the current MA/MEG, the network checks a continuity failure, and corresponding measures need to be taken, for example, reporting a system failure.

A configuration time difference exists during the process of configuring the information about the MEPs, so that a mis-check of the continuity is resulted from the time difference for delivering the configuration to the MEPs. If it plans to establish 10 MEPs to be checked in a certain MA/MEG, the information about the 10 MEPs needs to be delivered to the 10 MEPs. When the information about the 10 MEPs is configured to a first MEP, the MEP may start to periodically send a CCM frame, and expect to receive 9 CCM frames from the other MEPs. Due to the time difference in the configuration process, the other 9 MEPs possibly cannot send the CCM frames since the configuration thereof is not delivered yet. In this case, the first configured MEP may generate a mis-check of the continuity. The more configured MEPs exist in the MA/MEG, the more obvious the mis-check of the continuity will be.

Under the restriction of the mechanism, the leaving of an MEP may also result in a mis-check of the continuity. The ETH OAM exists as a normal-state OAM mechanism of the ETH, and thus, once the OAM starts to work, as long as the configuration is not cancelled, the OAM needs to work unintermittently. If a certain MEP in the MA/MEG leaves due to a certain reason, the other MEPs consider the leaving as a failure. Therefore, the mis-check of the continuity is resulted.

SUMMARY OF THE INVENTION

Various embodiments of the present invention provide a continuity check method, an MEP, and a system thereof. Through embodiments of the present invention, a continuity mis-check problem resulted from a time difference in the configuration and the leaving of an MEP is solved.

An embodiment of the present invention provides a continuity check method, which includes the following steps.

First, an MD group is maintained in a network, in which the MD group includes a plurality of MEPs in the network, and an MD group information base is configured, and the MD group information base stores information about the plurality of MEPs.

Then, according to the information stored in the MD group information base, a CCM is initiated, and then, continuity in the network is determined according to information returned from the plurality of MEPs in the MD.

Correspondingly, an embodiment of the present invention also provides an MEP, which includes an MD group information base and a continuity check module.

The MD group information base is configured to store information about MEP members in the MD group, in which the MD group is an association constituted by a plurality of MEP members in a network where the MEP is located.

The continuity check module is configured to initiate a CCM to the other members in the MD group according to the information stored in the MD group information base, so as to check the continuity of the network where the MD is located.

Correspondingly, an embodiment of the present invention further provides a network system, which includes a plurality of the above MEPs.

Through the embodiments of the present invention, a plurality of MEPs constitutes one MD group, and the information about each member in the MD is configured to all the MEPs in the MD group, so that the MEPs in the MD group initiate the continuity check without a mis-check of the continuity.

BRIEF DESCRIPTION OF THE DRAWINGS

To make the technical solutions of the present invention or the prior art more comprehensible, accompanying drawings required to be used in the descriptions of embodiments and the prior art are simply described below. Apparently, the accompanying drawings described below merely illustrate some of the embodiments of the present invention. Based on the accompanying drawings, those of ordinary skill in the art may obtain other accompanying drawings without making creative efforts.

DETAILED DESCRIPTION OF THE EMBODIMENTS

The technical solutions of the embodiments of the present invention are described below clearly and completely by reference to the accompanying drawings in the embodiments of the present invention. Apparently, the described embodiments are merely some of the embodiments of the present invention, rather than all of the embodiments. Based on the embodiments of the present invention, those of ordinary skill in the art can obtain other embodiments without making creative efforts, which all fall within the scope of the present invention.

In a continuity check method for an ETH OAM, an MEP, and a system thereof provided according to the embodiments of the present invention, a plurality of MEPs constitutes one MD group, and after a message of each MEP member is configured to all the MEP members in the MD group, a continuity check is initiated.

In the method according to an embodiment of the present invention, a plurality of MEPs constitutes one group, and each MEP in the group is a member of the group. After the information about all the MEPs in the group is configured to the MEP members in the group, each MEP has the rights and obligations of applying to join the group, querying the other MEP members, and reporting a leave message to the other MEP members in the group. It should be noted that, the group may be an MA or an MEG, and may also be a combination of a plurality of MEPs in the MA or the MEG.

Figure 1:
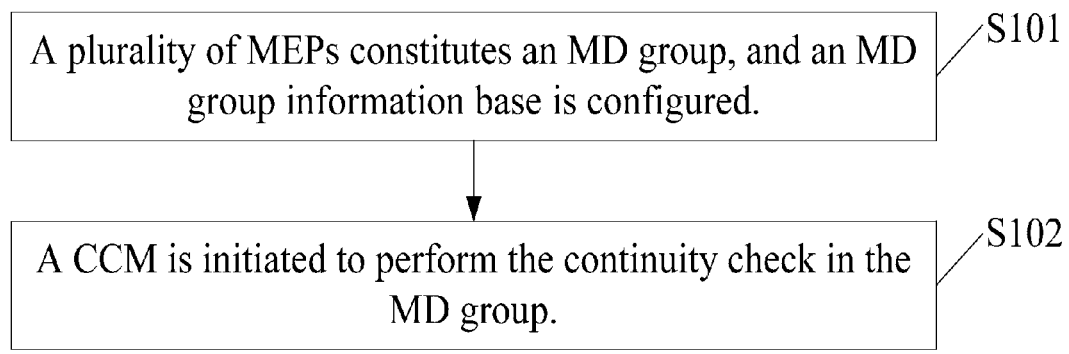
FIG. 1 is a first flow chart of a continuity check method for an ETH OAM according to an embodiment of the present invention.

FIG. 1 is a first flow chart of a continuity check method for an ETH OAM according to an embodiment of the present invention. Referring to FIG. 1, the method includes the following detailed steps.

In Step S101, a plurality of MEPs is configured to constituting an MD group, and an MD group information base is configured accordingly.

Particularly, the MD group may be an MA or an MEG. After information about each MEP is configured to all the MEP members in the MA or the MEG, the information is saved in the MEPs, and in this manner, the MEPs get to know the information about all the MEPs in the MD group, and thus, no mis-check problem occurs during the continuity check. During the specific implementation, MEPs in an MA or an MEG are generally considered as one group, and after the group is established, the information about each MEP is configured to each MEP. If the group exists, each MEP knows the information about all the MEPs in the group.

In Step S102, a CCM is initiated to perform the continuity check in the MD group.

Particularly, the MEP members in the MD group can initiate a query about the other members and report a leaving message to the other MEP members in the MD group. Each MEP member in the MD may leave the group, and a procedure of applying to join the group may also be initiated. When an MEP that does not belong to the MD group applies to join the group, the MEP should not initiate a continuity check because information about all the MEPs in the group is configured.

Figure 2:
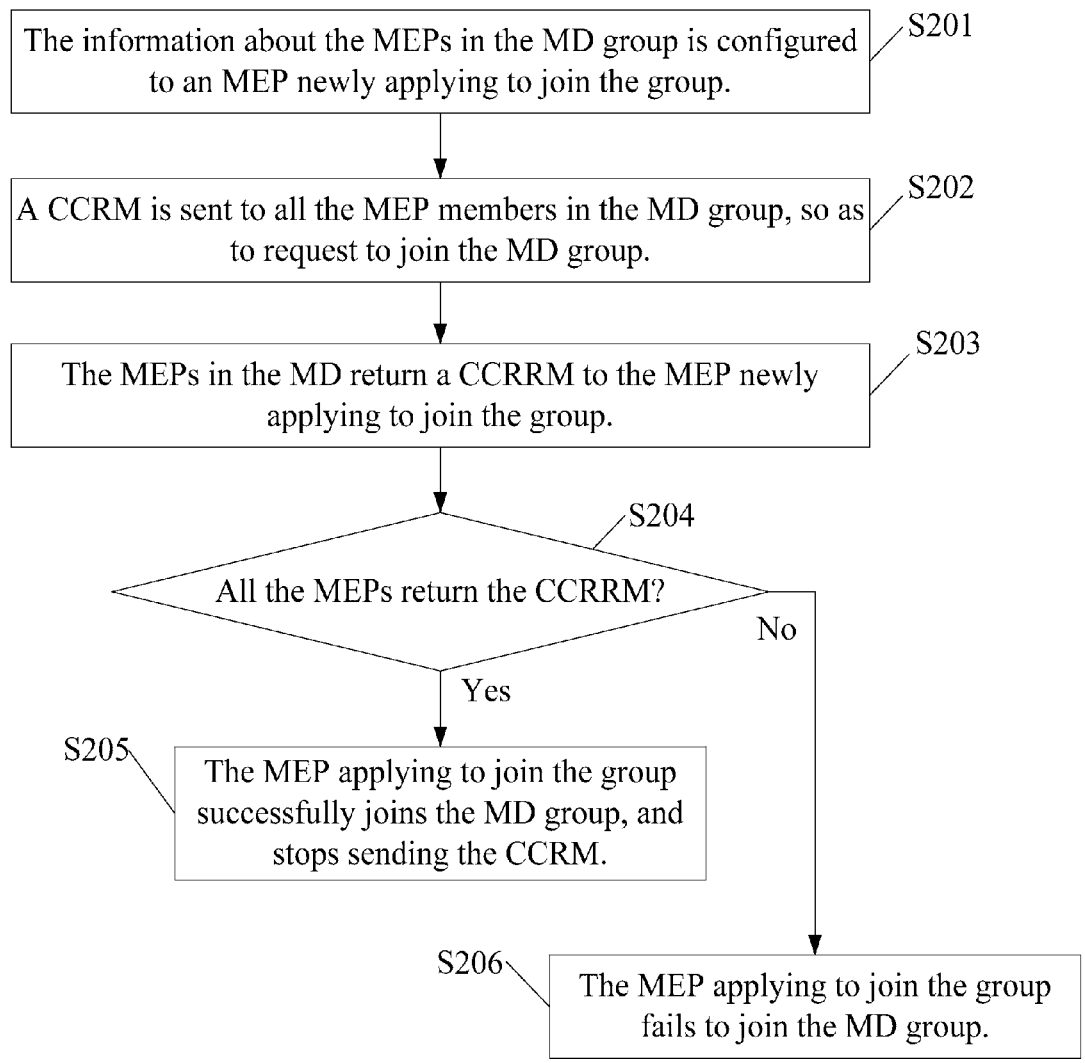
FIG. 2 is a second flow chart of the continuity check method for the ETH OAM according to an embodiment of the present invention.

FIG. 2 is a second flow chart of joining method for the ETH OAM according to the embodiment of the present invention. Referring to FIG. 2, when an MEP that does not belong to the MD group needs to join the group or an MEP in the MD group re-joins the group after leaving the group, a continuity check needs to be performed, and the detailed steps are described as follows.

In Step S201, the MEP applying to join the group receives the information about the MEPs in the group.

Particularly, in the embodiment of the present invention, the group is an MD, and after the MEP applies to join the group sends information of applying to join the group, a network management system configures the information about the MEPs in the MD to the MEP applying to join the group. In an alternative embodiment, an exclusively configured device may distribute the information about the MEPs in the MD to the MEP to join the group.

In Step S202, the MEP applying to join the group sends a continuity check request message (CCRM) to all the MEPs in the MD group, so as to request to join the MD group.

In Step S203, the MEPs in the MD return a continuity check request response message (CCRRM) to the MEP applying to join the group.

In Step S204, it is determined whether all the MEPs return the CCRRM or not, if yes, Step S205 is performed; otherwise, Step S206 is performed.

In Step S205, the MEP applying to join the group successfully joins the MD group, and stops sending the CCRM.

In Step S206, the MEP applying to join the group fails to join the MD group, and other processing measures need to be taken.

Particularly, when an MEP A that does not belong to the MD group requests to join the group or an MEP A in the MD group requests to re-join the group after leaving the group, after the information is configured to the MEP A, the MEP A needs to send CCRM to the members in the MD group to request to join the group. After the MEPs in the MD group receives the CCRM from the MEP A for the first time, the MEPs need to return a CCRRM to the MEP A, and since then, when receiving the CCRM from the MEP A once again, the MEPs directly discard the CCRM. After all the MEPs in the MD group return the CCRRM, the MEP A stops sending the CCRM, and the MEP A successfully joins the group. Otherwise, the MEP A needs to continuously send the CCRM for N times. After sending the CCRM for N times (N may be configured), if the MEP A still does not receive the CCRRM from all the other members, the MEP A stops sending the CCRM. In this case, after failing to join the group, the MEP A may send a query packet to query whether the corresponding MEP is on line or not. The corresponding MEP may ignore, and the MEP A only performs a continuity check to the other MEPs in the group that return a response.

During the process of joining the group, the MEP A sends the CCRM message to the members in the group. In this case, any MEP member only performs the continuity check on the MEP that sends the CCRM, rather than performing the continuity check on the other members.

Figure 3:
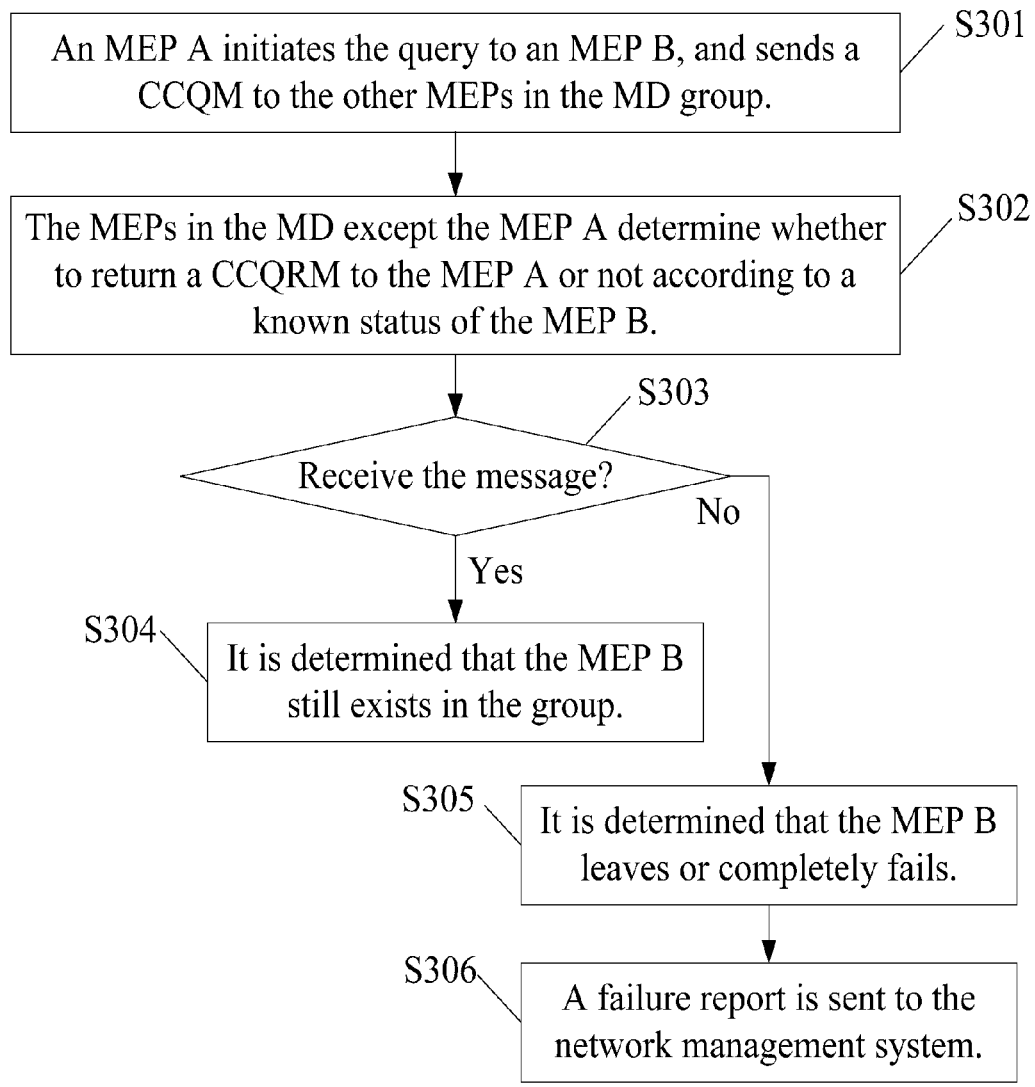
FIG. 3 is a third flow chart of the continuity check method for the ETH OAM according to an embodiment of the present invention.

FIG. 3 is a third flow chart of the continuity check method for the ETH OAM according to the embodiment of the present invention. Referring to FIG. 3, the MEPs in the MD group may initiate a query to the other members in the MD group to perform a continuity check, and the detailed steps are described as follows.

In Step S301, an MEP A initiates a continuity check query about an MEP B, and sends a continuity check query message (CCQM) to other MEPs in the MD group.

In Step S302, the MEPs in the MD except the MEP A determine whether to return a continuity check query response message (CCQRM) to the MEP A or not according to a known status of the MEP B.

In Step S303, it is determined whether the MEP A receives the CCQRM returned from the other MEPs in the MD or not; if yes, Step S304 is performed; otherwise, Step S305 is performed.

In Step S304, the MEP A determines that the MEP B still exists in the group and has maintained the continuity.

In Step S305, it is determined that the MEP B leaves or completely fails.

In Step S306, a failure report is sent to the network management system.

Particularly, after a certain MEP in the MD group does not continuously receive a CCM packet from another MEP in the MD group, the MEP may initiate a query, and it is assumed that the MEP A initiates the query about the MEP B. If the MEP A does not continuously receive the CCM packet from the MEP B, the MEP A sends the CCQM to the other MEPs (including the MEP B) in the MD group. If the MEP B does not leave or fail, the MEP B definitely exchanges CCM packets with some of the other members in the MD group, so that some of the other members in the MD group know the status of the MEP B, but the MEP A does not know the status of the MEP B. If the MEP B receives the CCQM packet sent from the MEP A, the MEP B directly returns the CCQRM to the other MEPs (except the MEP B, but including the MEP A) in the MD group. When the other MEPs (not including the MEP B and the MEP A) in the MD group receive the CCQM packet, the MEPs capable of continuously receiving the CCM message from the MEP B need to send the CCQRM to the other MEPs (including the MEP B and the MEP A) in the MD group. In order to ensure that the MEPs (including the MEP B) in the MD group receive the CCQM, the MEP A needs to continuously send the CCQM, till it receives the CCQRM sent from any one of the other MEPs (except the MEP A) in the MD group. If the MEP A does not receive any CCQRM after continuously sending N CCQMs, the MEP A considers that the MEP B leaves or completely fails, and needs to send a failure report to the network management system. While sending the failure report, the MEP A excludes the MEP B out of the group, does not concern the continuity of the MEP B, and performs the continuity check based on variants of a new member joining the group subsequent to the MEP B.

Figure 4:
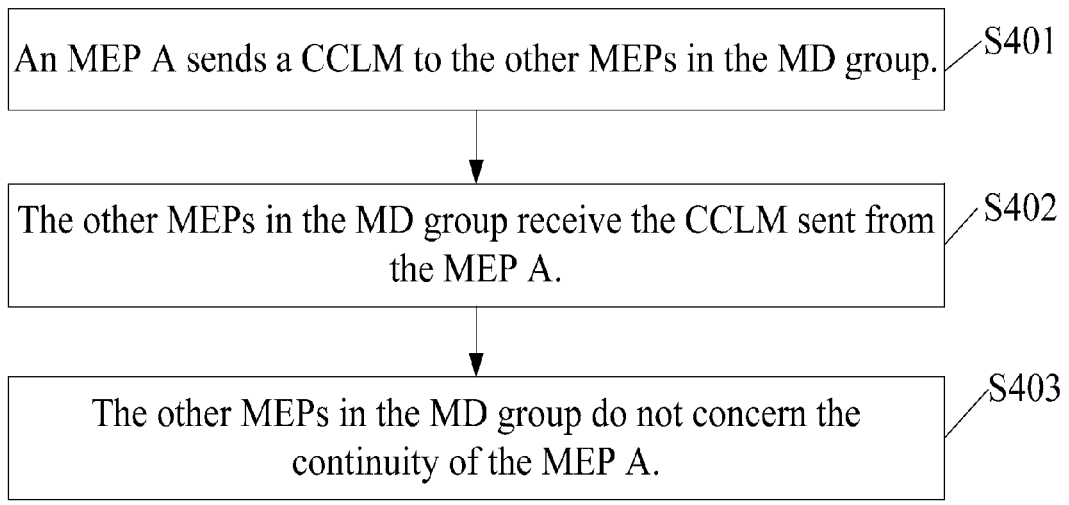
FIG. 4 is a fourth flow chart of the continuity check method for the ETH OAM according to an embodiment of the present invention.

FIG. 4 is a fourth flow chart of the continuity check method for the ETH OAM according to the embodiment of the present invention. Referring to FIG. 4, when a certain MEP in the MD group leaves the MD group, the MEP needs to notify the other members in the MD that it leaves, and the detailed steps are described as follows.

In Step S401, an MEP A sends a continuity check leave message (CCLM) to the other MEPs in the MD group.

In Step S402, the other MEPs in the MD group receive the CCLM sent from the MEP A.

In Step S403, the other MEPs in the MD group do not concern the continuity of the MEP A any more.

Particularly, if the MEP A as a member in the MD group wants to leave, the MEP A needs to send a CCLM packet to the other MEPs. In order to ensure that the other MEPs in the MD group receive the CCLM message, the MEP A needs to continuously send the CCLM message for N times. After receiving the CCLM, the other MEPs need to delete the MEP A from the MEP Database thereof, and does not expect to receive a CCM packet from the MEP A.

Correspondingly, in an embodiment, the present invention further provides a network system. The network system includes a plurality of MEPs. The plurality of MEPs constitutes one MD group, and meanwhile, MD group information is generated according to the MD group and is stored in each MEP in the MD group. The MD group information includes messages of all the MEP members in the MD group configured to each MEP member in the MD group, and due to the interoperability among the MEP members in the MD group, each MEP member may initiate a continuity check to another member through a CCM.

During practical applications, the constituted MD group is an MA or an MEG. A network management system is further configured in the network system, and the network management system is configured to receive a failure status reported by a certain MEP member when the certain MEP member in the MD group checks that another member in the MD group fails.

Figure 5:
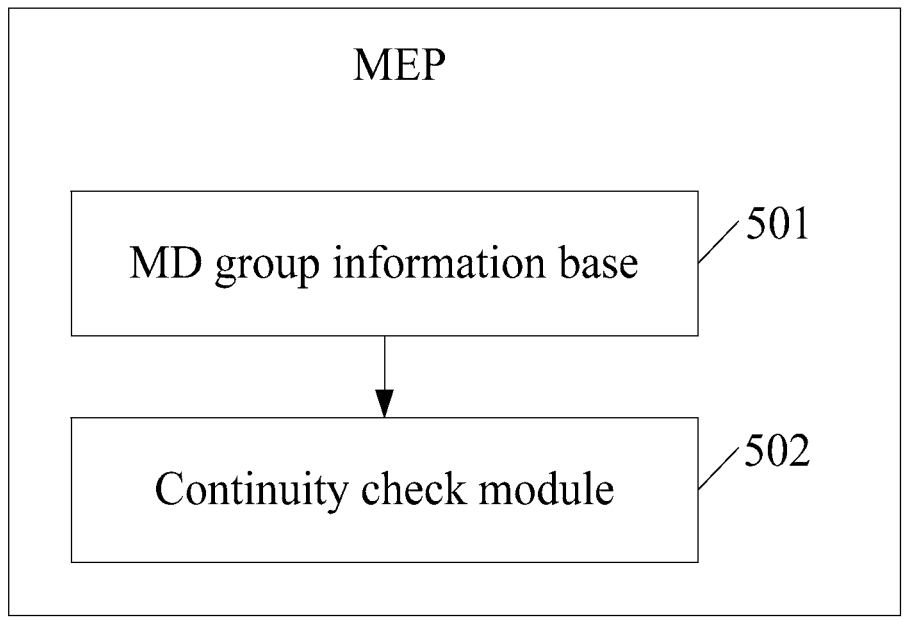
FIG. 5 is a schematic structural view of an MEP according to an embodiment of the present invention.

FIG. 5 is a schematic structural view of an MEP according to an embodiment of the present invention. Referring to FIG. 5, the MEP includes an MD group information base 501 and a continuity check module 502.

The MD group information base 501 is configured to store information about MEP members in an MD group which the MEP belongs to. The MD group information base 501 is also configured to store information about each MEP in a certain MD group when the MEP joins the certain MD group.

The continuity check module 502 is configured to initiate a CCM according to the MD group information stored in the MD group information base 501 to check a continuity of each MEP in the MD group.

Figure 6:
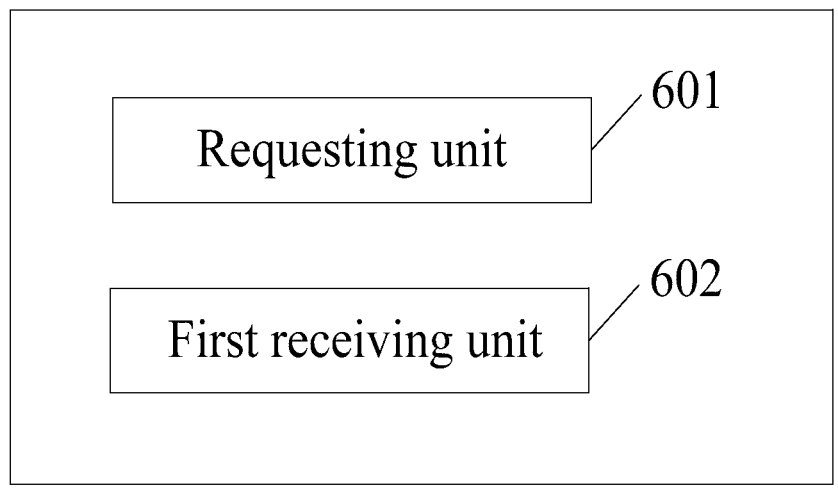
FIG. 6 is a first schematic structural view of a continuity check module according to an embodiment of the present invention.

Particularly, the continuity check module 502 further includes a requesting unit 601 and a first receiving unit 602, which are particularly shown in FIG. 6.

The requesting unit 601 is configured to initiate a CCRM to request to join an MD group to all MEPs in the MD group where the MEP requests to join.

The first receiving unit 602 is configured to receive CCRRMs returned from the MEPs in the MD group where the MEP applies to join.

When a certain MEP newly joins a certain MD group or re-joins a certain MD group, the MEP needs to initiate the CCRM. When the first receiving unit 602 receives the CCRRMs returned from all the MEPs, the request sent from the requesting unit 601 is accepted by the whole MD group, so that the MEP becomes a member in the MD group.

Figure 7:
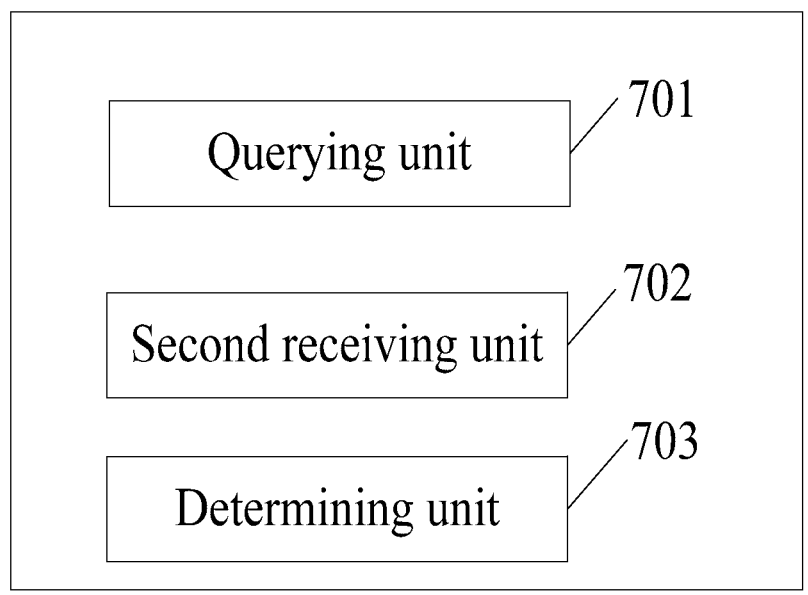
FIG. 7 is a second schematic structural view of the continuity check module according to an embodiment of the present invention.

Particularly, the continuity check module 502 further includes a querying unit 701, a second receiving unit 702, and a determining unit 703, which are particularly shown in FIG. 7.

The querying unit 701 is configured to send a CCQM to MEPs in the MD group, so as to query a continuity status of a certain MEP.

When any member in the MD group knows the continuity status of the queried MEP, the MEP member may return a CCQRM to other MEPs correspondingly. The second receiving unit 702 is configured to receive the CCQRM returned from any MEP including the queried MEP.

The determining unit 703 is configured to determine whether the queried MEP leaves or fails according to whether the second receiving unit 702 receives the CCQRM or not.

The querying unit 701 initiates a continuity query on a certain member in the MD group, and all the members in the MD group that know the continuity status of the queried member, including the queried MEP, may report the continuity status of the queried MEP to the other members accordingly. As long as the MEP initiating the query receives a message returned from any MEP, the continuity status of the queried MEP is determined. If no message is returned, the MEP initiating the query may consider that the queried MEP fails or leaves, and the MEP initiating the query needs to report the status to the network management system.

Figure 8:
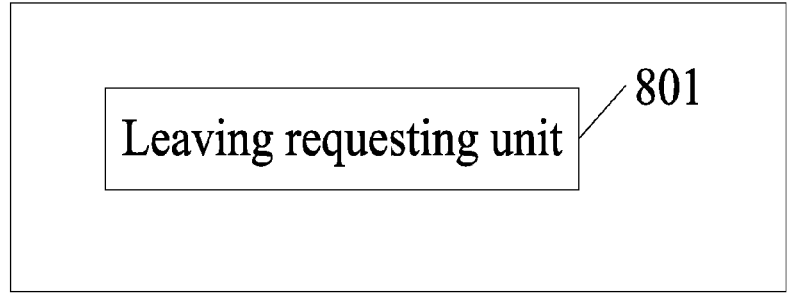
FIG. 8 is a third schematic structural view of the continuity check module according to an embodiment of the present invention.

Particularly, the continuity check module 502 further includes a leaving requesting module 801, which is particularly shown in FIG. 8.

The leaving requesting module 801 is configured to send a CCLM to the other MEPs in the MD group when the MEP leaves the MD group. After receiving the message, the other MEPs do not concern the continuity of the MEP.

Figure 9:
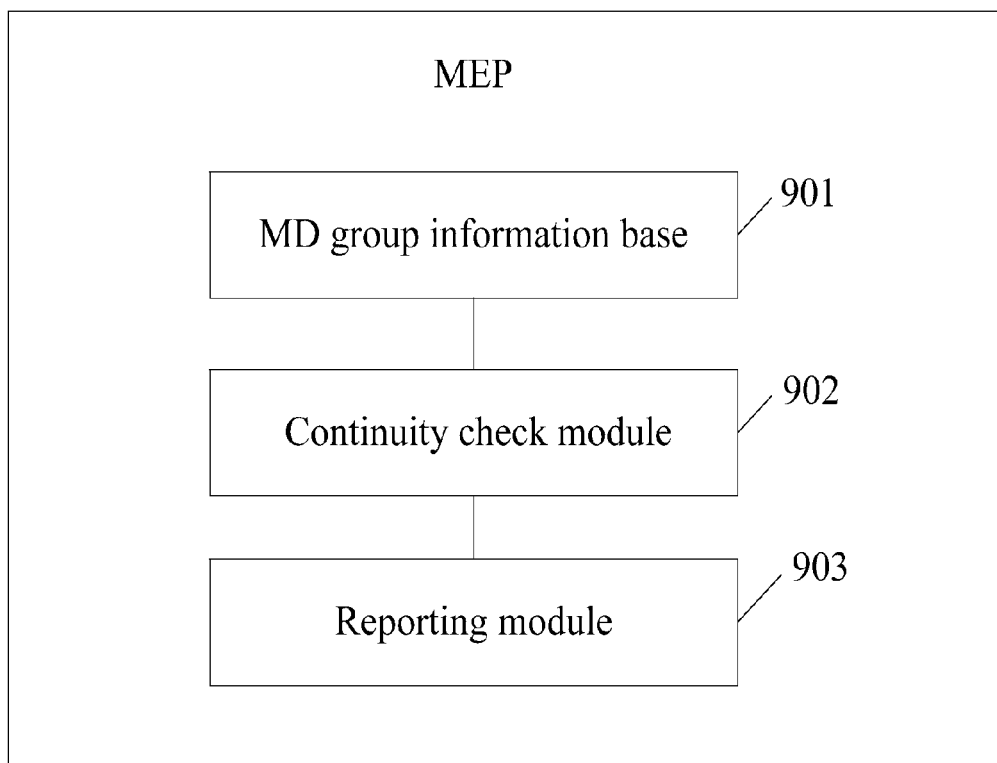
FIG. 9 is another schematic structural view of the MEP according to an embodiment of the present invention.

Correspondingly, FIG. 9 is another schematic structural view of the MEP according to the embodiment of the present invention. Referring to FIG. 9, the MEP includes an MD group information base 901, a continuity check module 902, a reporting module 903, and a deleting module 904.

After a plurality of MEPs constitutes an MD group, the MD group information base 901 is configured to store information about all the MEP members in the MD group configured to the MEP members in the MD group. The MD group information base 901 also needs to store information about each MEP in a certain MD group when the MEP joins the certain MD group.

The continuity check module 902 is configured to initiate a CCM according to the MD group information stored in the MD group information base 901 to check a continuity of each MEP in the MD group.

The reporting module 903 is configured to report to the network management system that a certain MEP in the MD group fails, when the continuity check module 902 checks that the certain MEP in the MD group leaves or fails.

To sum up, through the method according to the embodiment of the present invention, the continuity mis-check problem of the network-level ETH OAM caused by a time difference in the configuration and the leaving of a certain MEP is solved. In the embodiments of the present invention, a complete set of joining, querying, and leaving mechanisms of the MEPs for the ETH OAM is also provided. The joining mechanism solves the mis-check problem resulted from the configuration difference, so as to ensure that the MEP that starts performing the continuity check is an MEP that finishes the configuration. Meanwhile, an MEP is enabled to be dynamically added to the MA/MEG without causing a mis-alarm during an operation process. The querying mechanism solves a problem about reporting a failure and deleting a certain MEP after the certain MEP lost contact with the other MEPs in the MA/MEG due to a power failure or other failures and forms an isolated island, so as to avoid continuously generating a failure report without any information content. The leaving mechanism excellently solves the continuity mis-check problem resulted from the active leaving of a certain MEP.

The above descriptions are merely a preferred embodiment of the present invention, and the scope of the present invention is not limited thereby. Various equivalent modifications without departing from the scope or spirit of the present invention should be considered falling within the scope of the present invention.

Further, the method and system in accordance with the embodiment of the present invention should also be applied in other kind of network, for accessing the network and checking continuity, for example, a node A joins a network with a plurality of member, or, a member of the network performs continuity checking in the network.

Through the above descriptions of the embodiments, it is apparent to those skilled in the art that, the present invention may be accomplished by software in combination with a necessary hardware platform, and definitely may also be completely accomplished by hardware. Based on such understanding, all or a part of the above technical solutions of the present invention that makes contributions to the prior art can be substantially embodied in the form of a software product. The computer software product may be stored in a storage medium such as a ROM/RAM, a magnetic disk, or an optical disk, and contain several instructions to instruct computer equipment (for example, a personal computer, a server, or network equipment) to perform the method as described in the embodiments of the present invention or in some parts of the embodiments of the present invention.

What is claimed is:

1. A continuity check method for a network, wherein the network comprises a group with a plurality of members, and each of the members of the group comprises information of other members of the group, the method comprises:
    sending, by a node A, a continuity check query message (CCQM) to the members of the network, initiating a continuity check query about a member B of the group; and
    determining, by the node A, whether the member B still maintains continuity with the members of the group, according to a continuity check query response message (CCQRM) sent by any of the members of the group which recognizes status information of the member B, wherein the members of the group which recognizes status information of the member B comprises members of the group other than the member B.

2. The method according to claim 1, further comprising:
    sending, by the node A, a failure report to a network management system when the node A finds the member B has lost continuity with all the members of the group.

3. The method according to claim 1, wherein the method further comprises:
    determining, by the node A, the member B lost continuity with all the members of the group, if none of the members of the group sends the CCQRM to the node A.

4. The method according to claim 1,
    wherein the network is an Ethernet (ETH), and the members and the node A are all maintenance end points (MEPs).

5. A network system, comprising a group with a plurality of members, wherein the members of the group each comprise a hardware platform with a plurality of units, further comprising:
- a group information base, configured to store information about other members in the group;
- a querying unit, configured to send a continuity check query message (CCQM) to other members of the group about a Member B;
- a receiving unit, configured to receive a continuity check request response message (CCRRM) returned by the member of the group which recognizes state information of the member B, wherein the members of the group which recognizes status information of the member B comprises members of the group other than the member B;
- a determining unit, configured to determine whether the member B still keeps continuity according to the CCRRM received by the receiving unit.

6. The network system according to claim 5, wherein the determining unit determines whether the member B still keeps continuity according to the response of the members of the group except the member B.

* * * * *